United States Patent
Ikeda

(10) Patent No.: US 8,991,449 B2
(45) Date of Patent: Mar. 31, 2015

(54) PNEUMATIC TIRE WITH TREAD HAVING CENTRAL LAND PORTION, MIDDLE LAND PORTIONS AND SHOULDER LAND PORTIONS

(75) Inventor: Akio Ikeda, Kobe (JP)

(73) Assignee: Sumitomo Rubber Industries, Ltd., Kobe-Shi (JP)

( * ) Notice: Subject to any disclaimer, the term of this patent is extended or adjusted under 35 U.S.C. 154(b) by 1023 days.

(21) Appl. No.: 12/436,916

(22) Filed: May 7, 2009

(65) Prior Publication Data

US 2009/0277550 A1 Nov. 12, 2009

(30) Foreign Application Priority Data

May 8, 2008 (JP) ................................ 2008-122528

(51) Int. Cl.
*B60C 11/11* (2006.01)
*B60C 11/12* (2006.01)
*B60C 11/03* (2006.01)

(52) U.S. Cl.
CPC ......... *B60C 11/11* (2013.01); *B60C 2011/0348* (2013.04); *B60C 11/0306* (2013.04); *B60C 11/12* (2013.01); *B60C 2011/0388* (2013.04); *B60C 2011/1213* (2013.04)
USPC ...................................... 152/209.1

(58) Field of Classification Search
CPC B60C 11/11; B60C 2011/1213; B60C 11/12; B60C 11/0306; B60C 2011/0348
USPC ............. 152/209.18, 209.22, 209.27, DIG. 3, 152/902
See application file for complete search history.

(56) References Cited

U.S. PATENT DOCUMENTS

| | | | | |
|---|---|---|---|---|
| 3,584,670 | A  * | 6/1971 | Verdier | 152/902 |
| 6,446,689 | B1 * | 9/2002 | Elkurd et al. | 152/209.18 |
| 6,571,844 | B1 * | 6/2003 | Ochi et al. | 152/209.27 |

(Continued)

FOREIGN PATENT DOCUMENTS

| | | |
|---|---|---|
| EP | 1070606 A2 | 1/2001 |
| EP | 1630007 A1 | 3/2006 |
| EP | 1961587 A1 | 8/2008 |

(Continued)

OTHER PUBLICATIONS

Machine translation for Japan 2000-225814 (no date).*

(Continued)

*Primary Examiner* — Steven D Maki
(74) *Attorney, Agent, or Firm* — Birch, Stewart, Kolasch & Birch, LLP

(57) ABSTRACT

A pneumatic tire 1 is provided in a tread portion 2 with four main circumferential grooves 3 having a groove width HG of not less than 4 mm, thereby dividing the tread portion into a central land portion 4c, a pair of middle land portions 4m, and a pair of shoulder land portions 4s. Each land portions 4c, 4m, and 4s is made of block rows Bc, Bm, and BS divided by axial grooves 5, and each block 6 has sipes 7. An axial width Wc of the central land portion 4c is 10 to 15% of a tread ground contacting width TW; an axial width Wm of the middle land portion 4m is 15 to 22% of the tread ground contacting width TW; and an axial width Ws of the shoulder land portion 4s is 15 to 22% of the tread ground contacting width TW.

The middle land portion 4m is divided into an axially inner part 4mi and an axially outer part 4mo each having a groove width HG of in a range of 2 to 6 mm in the tire circumferential direction.

7 Claims, 4 Drawing Sheets

(56) References Cited

U.S. PATENT DOCUMENTS

| | | |
|---|---|---|
| 2006/0032566 A1* | 2/2006 | Koya .................. 152/209.18 |
| 2007/0089821 A1* | 4/2007 | Kishizoe ................ 152/209.2 |

FOREIGN PATENT DOCUMENTS

| | | | |
|---|---|---|---|
| JP | 63-071404 | * | 3/1988 |
| JP | 63-078805 | * | 4/1988 |
| JP | 6-72107 A | | 3/1994 |
| JP | 11-245625 | * | 9/1999 |
| JP | 2000-225814 A | * | 8/2000 |
| JP | 2001-30720 A | | 2/2001 |
| JP | 2005-280367 A | | 10/2005 |
| JP | 2005-280455 A | | 10/2005 |
| JP | 2006-51891 A | | 2/2006 |
| JP | 2006-232151 A | | 9/2006 |
| JP | 2006-298057 A | | 11/2006 |
| JP | 2006-298202 A | | 11/2006 |

OTHER PUBLICATIONS

Machine translation for Japan 11-245625 (no date).*
Translation for Japan 63-078805 (no date).*

* cited by examiner

PNEUMATIC TIRE WITH TREAD HAVING CENTRAL LAND PORTION, MIDDLE LAND PORTIONS AND SHOULDER LAND PORTIONS

BACKGROUND OF THE INVENTION

1. Field of the Invention

The present invention relates generally to pneumatic tires, and in particular to a pneumatic tire being ideal as a studless tire and having both of on-ice performance and on-snow performance improved in a well balance while suppressing occurrence of uneven wear.

2. Description of Related Art

It is known that a studless tire for an icy or snowy road, which is characterized by a tread pattern with five block rows that comprises a central block row, a pair of middle block rows on the outside thereof and a pair of shoulder block rows being provided outside the middle block rows as disclosed in Japanese unexamined Published Applications NOS. 2005-280367 and 2006-298057. If the number of block rows is not less than 6, it is difficult to keep steering stability on a dry road because of lack of pattern rigidity since the blocks are too small. If the numbers of block rows is not more than 4, it is difficult to keep on-snow performance because of lucking shearing force against snow under the tread. In such a tread pattern with the five block rows, shapes and numbers of the sipes in each block, ratio of the land portion to the tread pattern, and groove depths and the like have been determined in order to improve on-ice and on-snow performances.

In the recent years, with the development of speeding up and upgrading of a car, further improvement of the on-ice and on-snow performance is anticipated.

SUMMARY OF THE INVENTION

It is therefore, an object of the present invention to provide a pneumatic tire, in which the rate of widths among a central land portion, a middle land portion, and a shoulder land portion in a tread are determined, and both of on-ice performance and on-snow performance are improved in a well balance while suppressing occurrence of uneven wear.

According to the present invention, a pneumatic tire includes a tread portion comprising four main circumferential grooves each having a groove width HG of not less than 4 mm consisting of a pair of axially inner main circumferential groove extending on both sides of the tire equator C in the tire circumferential direction and a pair of axially outer main circumferential groove on the outer side thereof. Between the axially inner main circumferential grooves, provided is a central land portion having an axial width Wc being 10 to 15% of a tread ground contacting width TW of the tire. Between the axially inner main circumferential groove, provided is a pair of middle land portions each having an axial width Wm being 15 to 22% of the tread ground contacting width TW. And, between the axially outer main circumferential groove and a ground contact edge Te of the tread portion, provide is a pair of shoulder land portions each having an axial width Ws being 15 to 22% of the tread ground contacting width TW. Each of the central land portion, middle land portion and shoulder land portion are divided into a plurality of blocks by a plurality of axial grooves, respectively. Also, a sipe is provided on each block. Moreover, a narrow circumferential groove with a groove width Hg smaller than that of the main groove width HG is provided to divide each middle land portion into an axially inner part and an axially outer part are provided.

BRIEF DESCRIPTION OF THE DRAWINGS

Embodiment of the present invention will now be described in detail in conjunction with the accompanying drawings.

DESCRIPTION OF THE PREFERRED EMBODIMENTS

Figure 1:
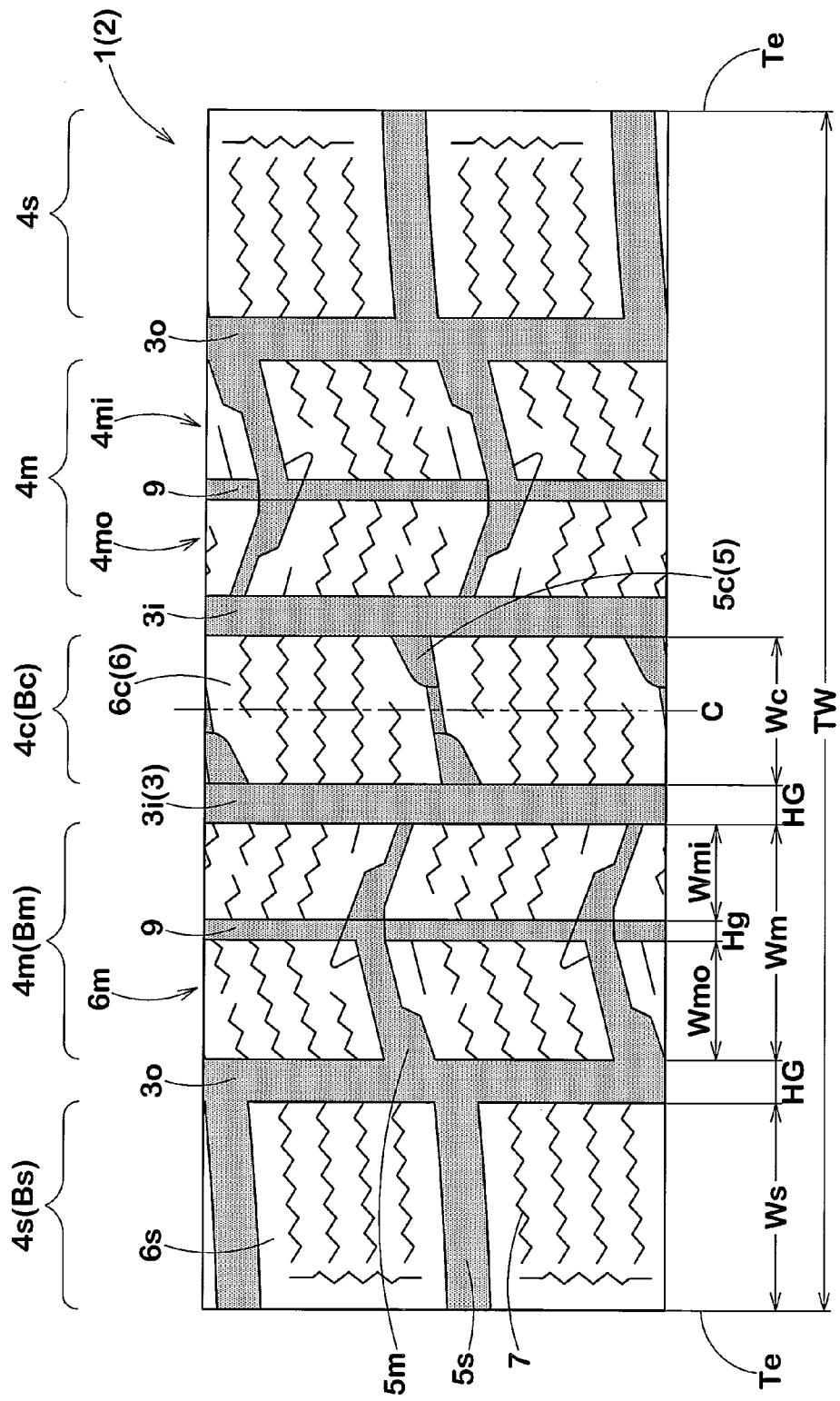
FIG. 1 is a development view of a preferred embodiment of the present invention showing a tread pattern of a pneumatic tire.

FIG. 1 shows a tread pattern of a pneumatic tire 1 in accordance with an embodiment of the present invention. In this embodiment, the pneumatic tire 1 is a studless tire for a passenger car.

The pneumatic tire 1 includes a tread portion 2 comprising four main circumferential grooves 3 each with a groove width HG of not less than 4 mm consisting of a pair of axially inner main circumferential groove 3$i$ extending on both sides of the tire equator C in the tire circumferential direction and a pair of axially outer main circumferential groove 3$o$ on the outer side thereof. The tread portion 2 of the tire 1, therefore, a central land portion 4$c$ each provided between axially inner main circumferential grooves 3$i$, a pair of middle land portions 4$m$ each provided between the axially inner main circumferential grooves 3$i$ and the axially outer main circumferential grooves 3$o$, and a pair of shoulder land portions 4$s$ each provided between the axially outer main circumferential groove 3$o$ and a ground contact edge Te.

The ground contact edge Te is an axially outermost end of an area which may contact ground when the tire 1 is mounted on a standard wheel rim J and inflated to the standard pressure (hereinafter, the "normally inflated state" of the tire). A distance between the ground contact edges Te is a tread ground contacting width TW.

Here, the standard wheel rim J is a design rim which may be a rim officially approved for the tire by a standard organization, i.e. JATMA (Japan and Asia), T&RA (North America), ETRTO (Europe), STRO (Scandinavia) and the like, namely, "Standard rim" in JATMA, "Design Rim" in TRA, "Measuring Rim" in ETRTO and the like. The standard pressure is the "maximum air pressure" in JATMA, the "Inflation Pressure" in ETRTO, the maximum pressure given in the "Tire Load Limits at various cold Inflation Pressures" table in TRA or the like. In case of passenger car tires, however, 180 kPa is used as the standard pressure.

Figure 2:
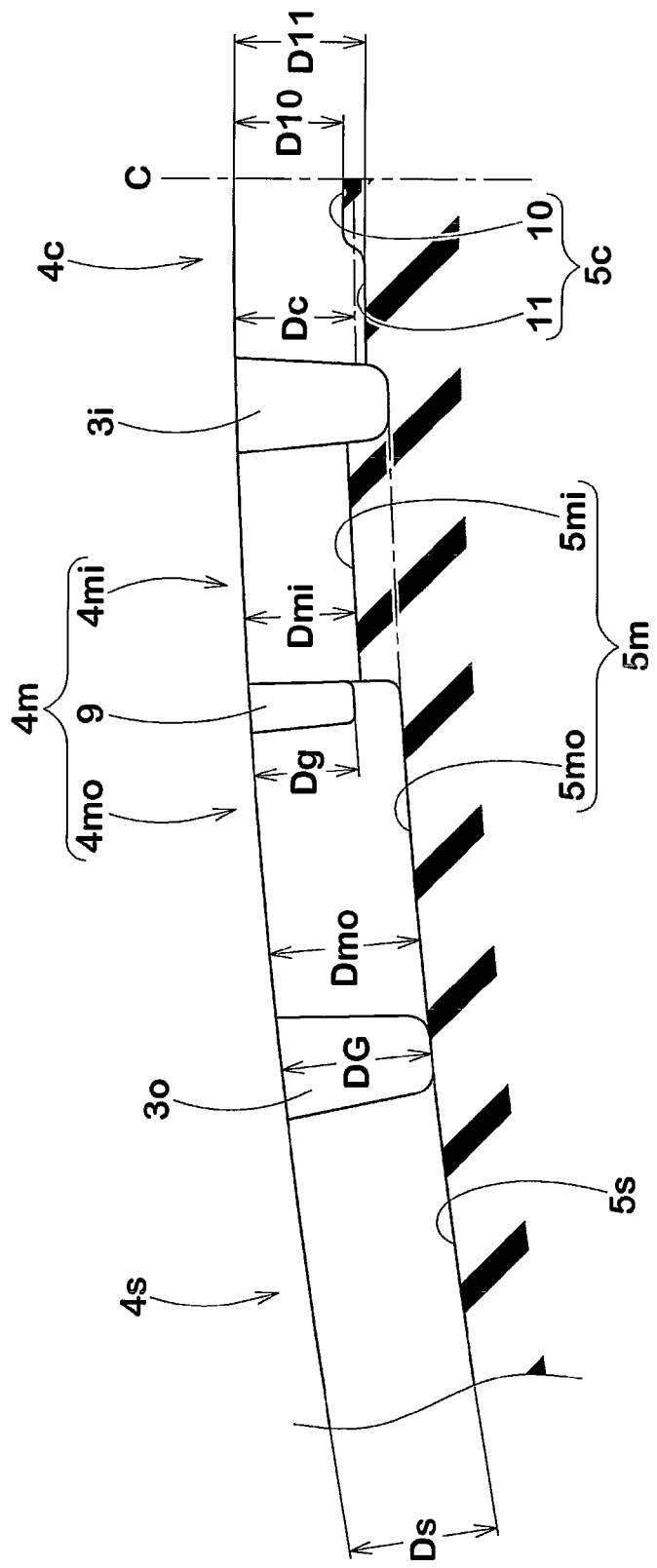
FIG. 2 is a cross-sectional view of a tread portion showing partially the depths of a main circumferential groove and an axial grooves.

The main circumferential groove 3 has a groove width HG of not less than 4 mm. In order to prevent uneven wear, the edge of the main circumferential groove 3, which is a vertex of a groove-sidewall surface with a tread surface, preferably extends in a straight line. In order to improve shearing force against snow under the tread portion, the main circumferential groove 3 preferably extends in the tire circumferential direction while keeping its certain cross sectional shape. As shown in FIG. 2, a groove depth DG of the main circumferential groove 3 for a studless tire is generally set to in a range of from 5.0 to 10.0 mm, more preferably 8.0 to 10.0 mm.

All the central land portion 4c, middle land portion 4m, and shoulder land portion 4s are made of block rows that include a plurality of blocks 6 arranged in the circumferential direction of the tire divided by axial grooves 5. Further, each block 6 is provided with a plurality of sipes 7.

The central land portion 4c is formed of a block row BC made of central blocks 6c divided by central axial grooves 5c. The central land portion 4c has an axial width Wc being set to in a range of from 10 to 15% of the tread ground contacting width TW, more preferably set in a range of from 11 to 13% of the tread ground contacting width TW.

The middle land portion 4m is formed of a block row Bm made of middle blocks 6m divided by middle axial grooves 5m. The middle land portion has an axial width Wm being set to in a range of from 15 to 22% of the tread ground contacting width TW, more preferably set in a range of from 18 to 21% of the tread ground contacting width TW.

The shoulder land portion 4s is formed of block rows BS made of shoulder blocks 6s divided by shoulder axial grooves 5s. The shoulder land portion has an axial width Ws being set to in a range of from 15 to 22% of the tread ground contacting width TW, more preferably set in a range of from 16 to 18% of the tread ground contacting width TW.

In this embodiment, the land portions 4c, 4m and 4s have the same pitch number of the axial grooves 5.

Under a condition of the tire contacting ground, a circumferential length of the central land portion 4c extending in the tire equator C is larger than that of the other land portions 4m and 4s. Increasing the width Wc makes increase a ground contacting area more than increasing the widths Wm and Ws of the middle and shoulder land portions. It is effective for improvement of grip performance or ever on-ice performance. On the other hand, by trading the width Ws decreases with an increase of the above-mentioned width Wc, lateral rigidity of the shoulder land portion 4s tends to fall, thereby steering stability on snowy road is deteriorated.

To improve both of the on-ice performance and on-snow performance in a well balance, it is important to increase each of the width Wc of the central land portion 4c and the width Ws of the shoulder land portion 4s with decreasing the width Wm of the middle land portion.

However, when the width Wm of the middle land portion 4m decreases too much, uneven wear so called heal-and-toe wear and punching wear occurs in the middle land portion 4m, thereby deteriorating grounding property earlier.

Therefore, in this embodiment of the present invention, the width Wm of the middle land portion 4m is set from 15 to 22% that is smaller than the conventional range. On the other hand, the width Wc of the central land portion 4c is set from 10 to 15%, and the width Ws of the shoulder land portion 4s is set from 15 to 22% that are larger than the conventional range.

If the width Wm of the middle land portion 4m is below the above-mentioned range, the uneven wear in the middle land portion 4m cannot be suppressed. If the width Wm of the middle land portion is over the above-mentioned range, the on-ice performance and on-snow performance cannot be improved since the widths Wc and Ws are not set to in the above range. If the width Wc and the width Ws are below the above-mentioned range, the on-ice and on-snow performances cannot be improved. And, if the widths Wc and Ws are over the range, it becomes difficult to be set the width Wm within the above range, thereby being likely to develop the uneven wear easily. The above-mentioned ranges of the widths Wc, Wm, and Ws set an upper limit of the above-mentioned groove width HG of the main circumferential groove 3.

These ranges, therefore, enable enlargement of the ground contacting area, and enhancement of the rigidity of the shoulder land portion 4s simultaneously, as well as and improvement the on-ice performance and on-snow performance in a well balance. Moreover, the middle land portion 4m can have a minimum width Wm, and the uneven wear can be effectively suppressed.

Each middle land portion 4m is provided with a narrow circumferential grooves 9 extending in the tire circumferential direction. The narrow circumferential groove has a groove width Hg that is smaller than the groove width HG of the main grooves 3. In this embodiment, the groove width Hg of the narrow circumferential groove is preferably set in a range of from 2 to 6 mm. The narrow circumferential grooves 9 divides the middle land portion 4m into an axially inner part 4mi and an axially outer part 4mo. To provide the narrow circumferential groove 9 helps keeping the circumferential rigidity of the middle land portion 4m, suppressing the uneven wear, and reducing lateral rigidity.

Figure 4:
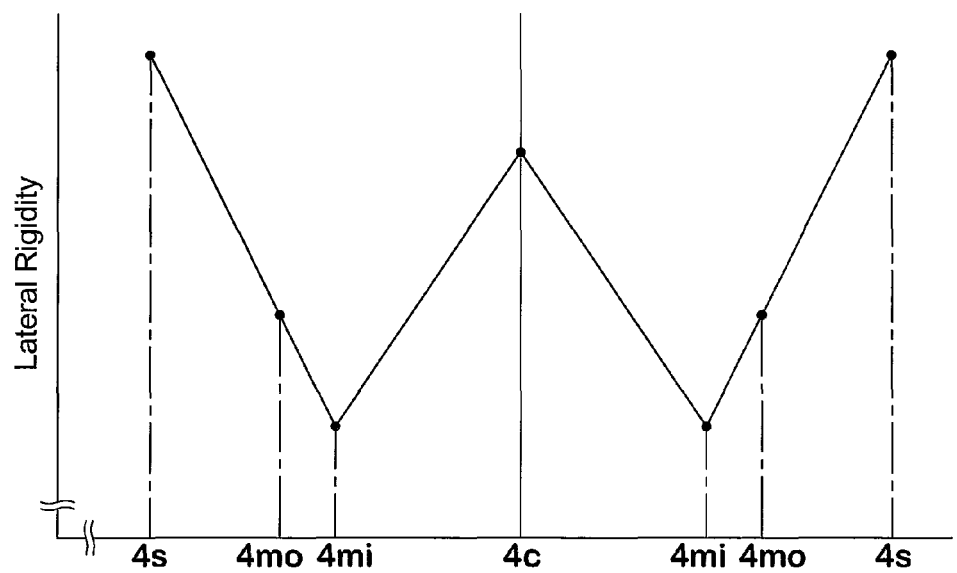
FIG. 4 is a distribution chart of lateral rigidity of the tread.

And, the inventor has found that the transitional characteristic from straight running to cornering as well as the smoothness of lane change on snowy, icy, and dry roads are improved effectively when the lateral rigidities of the central land portion 4c and the shoulder land portion 4s are large, when the lateral rigidity of the middle land portion 4m is small, and when there is a large difference there between. In this case, the distribution of lateral rigidity of the tread pattern is in approximately W-shape as shown in a graph of FIG. 4. In this embodiment of the present invention, therefore, by providing the middle land portion 4m with the narrow circumferential groove 9 to reduce the lateral rigidity, the approximately W-shape distribution in the lateral rigidity is achieved.

At this time, in order to execute the lateral rigidity distribution in more approximately W-shape, the width Ws, the width Wc, a width Wmi of the axially inner part of the middle land portion 4m, and a width Wmo of the axially outer part of the middle land portion 4m satisfy preferably the following relation:

$$Ws > Wc > Wmo > Wmi \qquad (1)$$

The transitional characteristic between straight running and cornering and the smoothness of lane change are improved further effectively.

In the pneumatic tire 1, the ground contacting end side of the pneumatic tire 1 develops more the grip performance on snow than the tire equator C side. Therefore, as shown in FIG. 2, a groove depth Dc of the central axial groove 5c, a groove depth DS of the shoulder axial groove 5s, a groove depth Dmi of the axial groove 5mi across the axially inner part 4mi of the middle land portion 4m, and a groove depth Dmo of the axial groove 5mo across the axially outer part of the middle land portion 4m satisfy the following relation:

$$Ds >= Dmo > DC >= Dmi \qquad (2)$$

when the groove depth Dc of the central axial groove 5c is nonuniform as in this embodiment, the grope depth Dc shall mean an average groove depth.

As shown in Relation (2), in the shoulder land portion 4s and the axially outer part 4mo of the middle land portion 4m, both of which develop the grip performance on snow, the groove depth DS and the groove depth Dmo are set to large. In such grooves, snow shearing force becomes large thereby improving the grip performance on snow effectively. While, the groove depth Dc is small in the central land portion 4c, so that the rigidity of the central land portion 4c becomes large. It serves drivers give enhanced solid response of on-snow steering. Moreover, the groove depth Dmi of the axially inner groove 5mi across the axially inner part 4mi of the middle land portion 4m is set to the smallest, therefore, excessive decrease in rigidity and the uneven wear become suppressed even if the axially inner part 4mi of the middle land portion 4m is small.

The groove depth Ds of the central axial groove 5c is in a range of 0.8 to 1.0 times larger than the groove depth DG of the main circumferential groove 3. And in the present embodiment, the groove depth DS is equivalent to the groove depth DG. The groove depth Dg of the narrow circumferential groove 9 is preferably not more than the groove depth Dmi in perspective of the uneven wear suppression.

Figure 3:
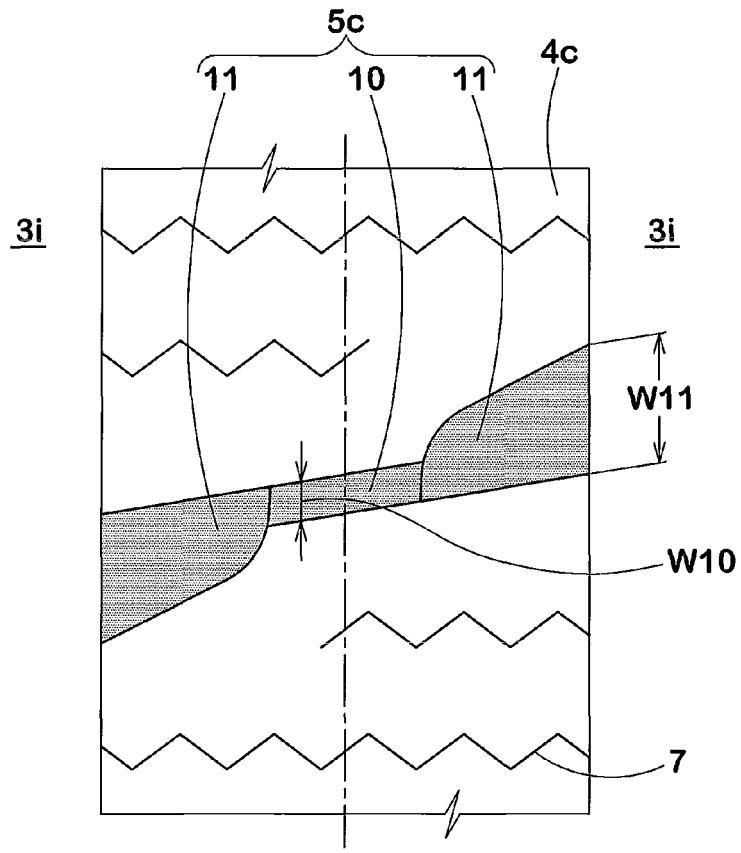
FIG. 3 is an enlarged development view of an axial groove in a central land portion.

As shown in FIG. 3, each of the central axial groove 5c comprises a central part 10 across the tire equator C, and a pair of axially outer parts 11 adjoin the central part 10 at both ends. A maximum width W11 of the axially outer part 11 is larger than a width W10 of the central part 10. The width W10 of the central part 10 in this embodiment is constant through the length of the central part 10. The width W11 of the outer part 11 increases gradually towards the axially inner main circumferential groove 3i. By forming such an axially outer part 11, snow shearing force becomes large thereby improving the grip performance on snow effectively. It serves drivers give enhanced solid response of on-snow steering.

As shown in FIG. 2, a depth D11 of the axially outer part 11 is set to larger than a depth D10 of the central part 10, thereby catching the snow therein more easily and obtaining large snow shearing force. Making bulk snow in the groove is also easy to some extent whenever the width w10 is equivalent to the width W11, when the depth D11 is set to be larger than the depth D10. It also serves drives give enhanced solid response.

The difference between the depth D11 and the depth D10 (D11−D10) is preferably not less than 1.0 mm.

Comparison Tests

Figure 5:
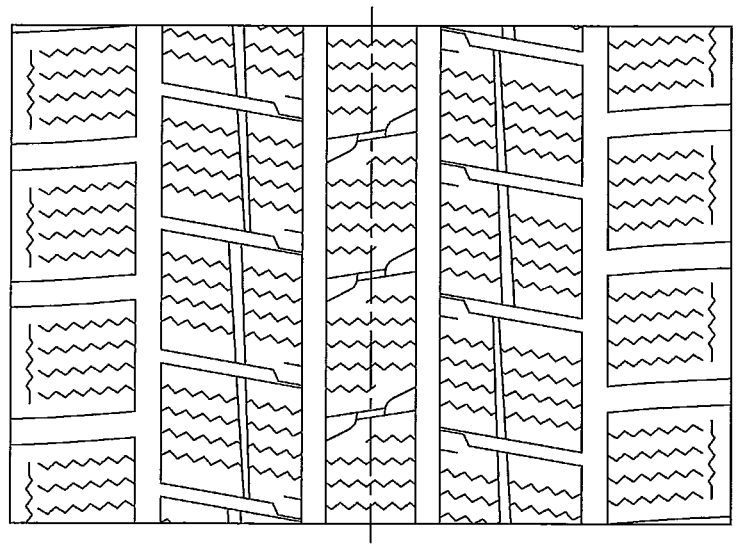
FIG. 5 is a schematic illustration of the tread pattern of Ref. Ex. 1 shown in Table 1.

Studless tires for test of 195/65R15 (rim size 15×6JJ) with the same tread pattern shown in FIG. 1 were made for the on-ice performance, on-snow performance, and uneven wear resistance. The width HG of the main circumferential groove is 5.9 mm, and the groove width Hg of the narrow circumferential groove is 2.8 mm. Meanwhile, a pattern of Ref. Ex. 1 is shown in FIG. 5.

1) On-Ice Performance:

A test car (2000 cc, FR car), provided on the every wheels with the test tire (pressure 200 kPa) was run on an icy road in a tire test course, and the steering stability was evaluated by the driver's feeling, based on the solid response of steering, ground contact impression, and rigid impression. The result was indicated in Table 1 by an index based on Ref. Ex. 1 being 100, wherein the larger index number, the better the performance.

2) On-Snow Performance:

The above-mentioned test car was run on a snowy road in a tire test course, and the steering stability was evaluated by the driver's feeling, based on the solid response of steering, ground contact impression, and rigid impression. The result was indicated in Table 1 by an index based on Ref. Ex. 1 being 100, wherein the larger index number, the better the performance.

3) Wear Resistance:

The above-mentioned test car was run on a dry asphalt road for distance of 8000 km, and then the wear status of middle land portion was compared with that of other land portions. The result was indicated in Table 1 by an index based on Ref. Ex. 1 being 100, wherein the larger index number shows the better wear resistance.

TABLE 1

|  | Ex. 1 | Ex. 2 | Ex. 3 | Ref. Ex. 1 | Ref. Ex. 2 | Ref. Ex. 3 | Ref. Ex. 4 | Ref. Ex. 5 |
|---|---|---|---|---|---|---|---|---|
| Pattern | FIG. 1 | FIG. 1 | FIG. 1 | FIG. 5 | FIG. 1 | FIG. 1 | FIG. 1 | FIG. 1 |
| Ratio of land portion to tread pattern (%) | 70 | 70 | 70 | 71 | 70 | 70 | 70 | 70 |
| Width TW of Tread ground contacting portion (mm) | 164 | 164 | 164 | 167 | 164 | 164 | 164 | 164 |
| Edge component | 37700 | 37700 | 37700 | 41100 | 37700 | 37700 | 37700 | 37700 |
| Depth DG of Main circumferential groove (mm) | 9.0 | 9.0 | 9.0 | 9.9 | 9.0 | 9.0 | 9.0 | 9.0 |
| Depth Dg of Narrow circumferential groove (mm) | 5.8 | 5.8 | 5.8 | 5.8 | 5.8 | 5.8 | 5.8 | 5.8 |
| Width Wc of Central land portion (mm) | 20.8 | 20.8 | 20.8 | 20.0 | 15.0 | 25.0 | 20.8 | 20.8 |
| Wc/TW (%) | 12.7 | 12.7 | 12.7 | 12.0 | 9.1 | 15.2 | 12.7 | 12.7 |
| Width Wm of Middle land portion (mm) | 32.9 | 32.9 | 32.9 | 39.2 | 32.9 | 32.9 | 24.0 | 42.0 |
| Wm/TW (%) | 20.1 | 20.1 | 20.1 | 23.5 | 20.1 | 20.1 | 14.6 | 25.6 |
| Width Wmi of Axially inner part of Middle land portion (mm) | 13.5 | 13.5 | 13.5 | 16.5 | 13.5 | 13.5 | 18.0 | 9.0 |
| Width Wmo of Axially outer part of Middle land portion (mm) | 16.6 | 16.6 | 16.6 | 20.3 | 16.6 | 16.6 | 21.1 | 12.1 |
| Width Ws of Shoulder land portion (mm) | 28.3 | 28.3 | 28.3 | 23.9 | 33.3 | 23.3 | 33.3 | 23.3 |
| Ws/TW (%) | 17.3 | 17.3 | 17.3 | 14.2 | 20.3 | 14.2 | 20.3 | 20.3 |
| Central axial groove | | | | | | | | |
| Depth D10 of Central part (mm) | 4.5 | 6.0 | 7.8 | 7.6 | 6.0 | 6.0 | 6.0 | 6.0 |
| Width W10 of Central part (mm) | 2.5 | 2.5 | 2.5 | 1.9 | 2.5 | 2.5 | 2.5 | 2.5 |
| Depth D11 of Axially outer part (mm) | 6.3 | 7.3 | 7.8 | 7.6 | 7.3 | 7.3 | 7.3 | 7.3 |
| Maximum width W11 of Axially outer part (mm) | 6.3 | 6.3 | 6.3 | 7.0 | 6.3 | 6.3 | 6.3 | 6.3 |
| Middle axial groove | | | | | | | | |
| Depth Dmi of Inward middle axial groove (mm) | 6.3 | 6.3 | 6.3 | 7.5 | 6.3 | 6.3 | 6.3 | 6.3 |
| Depth Dmo of Outward middle axial groove (mm) | 9.0 | 9.0 | 9.0 | 9.9 | 9.0 | 9.0 | 9.0 | 9.0 |
| Shoulder axial groove | | | | | | | | |
| Depth Ds of Shoulder axial groove (mm) | 9.0 | 9.0 | 9.0 | 9.9 | 9.0 | 9.0 | 9.0 | 9.0 |
| Performances | | | | | | | | |
| On-ice performance | 110 | 115 | 115 | 100 | 105 | 105 | 105 | 105 |
| On-snow performance | 110 | 115 | 105 | 100 | 95 | 95 | 90 | 90 |
| Wear resistance | 95 | 95 | 95 | 100 | 95 | 95 | 95 | 95 |

The invention claimed is:

1. A pneumatic tire including a tread portion, said tread portion comprising:

four main circumferential grooves having groove width HG of not less than 4 mm consisting of a pair of axially inner main circumferential grooves extending on both sides of the tire equator in the tire circumferential direction, and a pair of axially outer main circumferential grooves located on the outer side of said axially inner main circumferential grooves, a central land portion provided between said axially inner main circumferential grooves, a pair of middle land portions each provided between one of said axially inner main circumferential grooves and one of said axially outer main circumferential grooves, and a pair of shoulder land portions each provided between one of said axially outer main circumferential grooves and a ground contact edge of the tread, wherein each of said central land portion, said middle land portions and said shoulder land portions is divided into a plurality of blocks by axial grooves across each land portion, wherein the blocks are aligned in the circumferential direction, and a sipe is provided on each block, each of the axial grooves provided in each of said middle land portions comprises an axially inner portion and an axially outer portion, said axially inner portion is inclined with respect to an axial direction of the tire and has a groove width increasing axially outwardly, said axially outer portion is inclined in opposite direction with respect to said axially inner portion and has a groove width increasing axially outwardly, said axially inner portion and said axially outer portion are connected to form a V-shape, said central land portion has an axial width Wc being 10% to 15% of a tread ground contacting width TW, each of said middle land portions has an axial width Wm being 15% to 22% of the tread ground contacting width TW, each of said shoulder land portions has an axial width Ws being 15% to 22% of the tread ground contacting width TW; and each of only said middle land portions comprises a straight narrow circumferential groove extending in the circumferential direction of the tire and having a groove width Hg of 2 to 6 mm so as to divide said each middle land portion into an axially inner part and an axially outer part located on the inner side and the outer side of said narrow circumferential groove.

2. The pneumatic tire according to claim 1, wherein said axial width Ws, said axial width Wc, an axial width Wmi of said axially inner part of the middle land portion, and an axial width Wmo of said axially outer part of the middle land portion satisfy the following relation:

$Ws>Wc>Wmo>Wmi.$

3. The pneumatic tire according to claim 1, wherein a groove depth Dc of the axial groove in said central land portion, a groove depth Ds of the axial groove in said shoulder land portion, a groove depth Dmi of the axial groove in said axially inner part of the middle land portion, and a groove depth Dmo of the axial groove in said axially outer part of the middle land portion satisfy the following relation:

$Ds>=Dmo>Dc>=Dmi.$

4. The pneumatic tire according to claim 1, wherein each of the axial grooves provided in said central land portion comprises a central part across the tire equator and a pair of axially outer parts adjoin said central part at both ends, and a groove width of said axially outer part is larger than that of said central part.

5. The pneumatic tire according to claim 4, wherein the width of the axially outer parts of said each of the axial grooves increases towards said axially inner main circumferential grooves.

6. The pneumatic tire according to claim 1, wherein each of the axial grooves provided in said central land portion comprises a central part across the tire equator and a pair of axially outer parts adjoining said central part at both ends thereof, and a groove depth of said outer parts is larger than that of said central part.

7. The pneumatic tire according to claim 1, wherein said central land portion has an axial width Wc being 11% to 13% of the tread ground contacting width TW, each of said middle land portions has an axial width Wm being 18% to 21% of the tread ground contacting width TW, each of said shoulder land portions has an axial width Ws being 16% to 18% of the tread ground contacting width TW.

* * * * *